(12) United States Patent  (10) Patent No.: US 9,001,069 B2
Goto et al.  (45) Date of Patent: Apr. 7, 2015

(54) TECHNIQUE FOR EXECUTING A COMBINED OPERATION IN RESPONSE TO A SINGLE PRESS AND RELEASE OF A SENSOR UNIT

(71) Applicant: Sony Corporation, Tokyo (JP)

(72) Inventors: Koichi Goto, Kanagawa (JP); Mikiko Sakurai, Kanagawa (JP); Akio Yoshioka, Saitama (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/210,546

(22) Filed: Mar. 14, 2014

(65) Prior Publication Data

US 2014/0289677 A1    Sep. 25, 2014

Related U.S. Application Data

(60) Continuation of application No. 13/617,475, filed on Sep. 14, 2012, now Pat. No. 8,743,070, which is a continuation of application No. 13/246,299, filed on Sep. 27, 2011, now abandoned, which is a division of application No. 12/976,171, filed on Dec. 22, 2010, now abandoned, which is a continuation of application No. 10/524,354, filed on Feb. 14, 2005, now Pat. No. 7,948,476, which is a continuation of application No. PCT/JP2004/008593, filed on Jun. 11, 2004.

(30) Foreign Application Priority Data

Jun. 16, 2003  (JP) ................................. 2003-170493

(51) Int. Cl.
G06F 3/041  (2006.01)
G06F 3/0482  (2013.01)
G06F 3/0488  (2013.01)

(Continued)

(52) U.S. Cl.
CPC ............ *G06F 3/0482* (2013.01); *G06F 3/0488* (2013.01); *G06F 2203/0339* (2013.01); *H04N 5/44543* (2013.01); *H04N 5/44582* (2013.01); *H04N 5/74* (2013.01); *H04N 21/4126* (2013.01); *H04N 21/42207* (2013.01); *H04N 21/42209* (2013.01); *H04N 21/42222* (2013.01); *H04N 21/42224* (2013.01); *H04N 21/4622* (2013.01); *H04N 21/4782* (2013.01);

(Continued)

(58) Field of Classification Search
CPC .......................... G06F 3/0488; H04N 5/44543
USPC ................. 345/156, 173, 175, 179, 902, 169; 715/779, 808, 810, 827, 840, 866; 382/13; 178/18.03
See application file for complete search history.

(56) References Cited

U.S. PATENT DOCUMENTS 5,148,015 A    9/1992  Dolan
5,250,929 A    10/1993  Hoffman et al.

(Continued)

*Primary Examiner* — Pegeman Karimi
(74) *Attorney, Agent, or Firm* — Frommer Lawrence & Haug LLP; William S. Frommer; Ellen Marcie Emas

(57) ABSTRACT

A touch panel is constructed by a display/sensor unit which is slightly larger than a display screen of an LCD and a sensor unit which is projected to the outside from one side, for example, from one side on the right. A finger of the user is touched to a selection item such as desired button, icon, or the like on the display/sensor unit and vertically moved on the sensor unit. A selection display constructed by a plurality of buttons is displayed along the side of the display screen by the LCD. A button beside the finger is highlighted. When the finger is released, the highlighted button is selected. If there are no buttons adjacent to the finger, the button is not highlighted. Even if the finger is released, the state is not changed. When finger is moved to the display/sensor unit, the selection display disappears.

20 Claims, 12 Drawing Sheets

(51) Int. Cl.

| | | |
|---|---|---|
| *H04N 5/445* | (2011.01) | |
| *H04N 21/41* | (2011.01) | |
| *H04N 21/422* | (2011.01) | |
| *H04N 21/462* | (2011.01) | |
| *H04N 21/4782* | (2011.01) | |
| *H04N 21/482* | (2011.01) | |
| *H04N 21/485* | (2011.01) | |
| *G06F 3/0484* | (2013.01) | |
| *H04N 5/74* | (2006.01) | |

(52) U.S. Cl.
CPC .......... *H04N 21/482* (2013.01); *H04N 21/485* (2013.01); *G06F 3/04842* (2013.01)

(56) References Cited

U.S. PATENT DOCUMENTS

| | | | | |
|---|---|---|---|---|
| 5,398,045 | A | * | 3/1995 | Sach et al. .................. 345/172 |
| 5,434,929 | A | | 7/1995 | Beernink et al. |
| 5,524,201 | A | * | 6/1996 | Shwarts et al. .............. 715/763 |
| 5,581,670 | A | | 12/1996 | Bier et al. |
| 5,644,657 | A | * | 7/1997 | Capps et al. ................. 382/229 |
| 5,689,283 | A | | 11/1997 | Shirochi |
| 5,721,853 | A | | 2/1998 | Smith |
| 5,726,669 | A | | 3/1998 | Obata et al. |
| 5,745,718 | A | | 4/1998 | Cline et al. |
| 5,748,192 | A | | 5/1998 | Lindholm |
| 5,900,875 | A | * | 5/1999 | Haitani et al. ............... 715/840 |
| 5,912,667 | A | | 6/1999 | Chang |
| 5,977,948 | A | | 11/1999 | Nishibori |
| 5,990,975 | A | | 11/1999 | Nan et al. |
| 6,084,553 | A | | 7/2000 | Walls et al. |
| 6,125,230 | A | | 9/2000 | Yaginuma |
| 6,204,896 | B1 | | 3/2001 | Matsuhira et al. |
| 6,208,340 | B1 | * | 3/2001 | Amin et al. .................. 715/808 |
| 6,308,199 | B1 | | 10/2001 | Katsurabayashi |
| 6,331,840 | B1 | | 12/2001 | Nielson et al. |
| 6,337,698 | B1 | * | 1/2002 | Keely et al. .................. 715/823 |
| 6,344,836 | B1 | | 2/2002 | Suzuki |
| 6,545,669 | B1 | | 4/2003 | Kinawi et al. |
| 6,661,855 | B2 | | 12/2003 | Kim |
| 6,670,950 | B1 | | 12/2003 | Chin et al. |
| 6,919,864 | B1 | | 7/2005 | Macor |
| 7,027,035 | B2 | | 4/2006 | Youden |
| 7,373,605 | B2 | | 5/2008 | Schaper |
| 7,451,457 | B2 | | 11/2008 | Estrop |
| 7,898,529 | B2 | * | 3/2011 | Fitzmaurice et al. ......... 345/173 |
| 2001/0035860 | A1 | | 11/2001 | Segal et al. |
| 2001/0038395 | A1 | | 11/2001 | Holtzblatt et al. |
| 2002/0048413 | A1 | | 4/2002 | Kusunoki |
| 2002/0060750 | A1 | | 5/2002 | Istvan et al. |
| 2002/0073204 | A1 | | 6/2002 | Dutta et al. |
| 2002/0109665 | A1 | | 8/2002 | Matthews et al. |
| 2002/0109727 | A1 | | 8/2002 | Kono |
| 2002/0176016 | A1 | | 11/2002 | Misawa et al. |
| 2003/0142037 | A1 | | 7/2003 | Pinedo et al. |
| 2003/0229845 | A1 | | 12/2003 | Salesin et al. |
| 2004/0001099 | A1 | | 1/2004 | Reynar et al. |
| 2004/0150668 | A1 | | 8/2004 | Myers et al. |
| 2004/0153802 | A1 | | 8/2004 | Kudo et al. |
| 2004/0165013 | A1 | | 8/2004 | Nelson et al. |

* cited by examiner

TECHNIQUE FOR EXECUTING A COMBINED OPERATION IN RESPONSE TO A SINGLE PRESS AND RELEASE OF A SENSOR UNIT

This is a continuation of application Ser. No. 13/617,475, filed Sep. 14, 2012, which is a continuation of application Ser. No. 13/246,299, filed Sep. 27, 2011, now abandoned, which is a divisional of application Ser. No. 12/976,171, now abandoned, filed Dec. 22, 2010, which is a continuation of application Ser. No. 10/524,354, filed Feb. 14, 2005, now U.S. Pat. No. 7,948,476, issued May 24, 2011, which is based on international application number PCT/JP2004/008593, filed Jun. 11, 2004, which claims priority to Japanese application number 2003-170493, filed Jun. 16, 2003, the entirety of which is incorporated herein by reference.

TECHNICAL FIELD

The invention relates to an input apparatus with a construction in which a touch panel is attached onto a screen of a display such as a liquid crystal or the like and to an input method using such a kind of input apparatus.

BACKGROUND ART

Hitherto, as a digital broadcast receiver, a construction in which an auxiliary input/output apparatus having a small display is provided separately from a display main body having a large screen and the display main body and the auxiliary input/output apparatus are connected in a wireless manner has been disclosed in JP-A-2001-2030908. According to the apparatus disclosed in JP-A-2001-2030908, the auxiliary Input/output apparatus has a construction in which a touch panel is attached onto the screen, an electronic program table is displayed on the auxiliary input/output apparatus, and the operation to select a desired program or reserve the recording of the desired program is executed through the touch panel of the auxiliary input/output apparatus.

However, in a system having the two displays as disclosed in JP-A-2001-2030908, in the case where the auxiliary input/output apparatus has the construction of the touch panel, when broadcast contents, Internet contents, or the like is selected and monitored by the operation of the touch panel, the operations of two stages are necessary. That is, when the user selects desired contents, first, he enters a menu display mode or executes the operation corresponding to the operation for entering the menu display mode and, thereafter, he selects a source to be monitored from the menu. In this manner, the operations of two stages are necessary until the target reaches the desired contents.

It is, therefore, an object of the invention to an input method and an input apparatus in which in the case of inputting by using a touch panel, the operation to display a menu and the operation to select a source to be monitored from the displayed menu can be executed at a time and the operability is improved.

DISCLOSURE OF INVENTION

To solve the above problems, according to the invention of Claim 1, there is provided an input method using an input apparatus in which a touch panel is laminated onto a display screen of a display apparatus, a sensor unit is formed so as to be expanded to the outside of one side of the display screen, an instruction according to a touching position of a finger or a touch pen onto the sensor unit is given, and a controller generates a control signal on the basis of the instruction, comprising the steps of: displaying a selection display comprising a plurality of selection items along the side of the display screen when the finger or the touch pen is touched to the sensor unit; instructing one of the selection items when the finger or the touch pen is moved along the side on the sensor unit; and instructing selection of the instructed selection item when the finger or the touch pen is released from the sensor unit.

According to the invention of Claim 5, there is provided an input apparatus in which a touch panel is laminated onto a display screen of a display apparatus, comprising: a sensor unit formed so as to be expanded to the outside of one side of the display screen; and a controller to which an instruction according to a touching position of a finger or a touch pen onto the sensor unit is given and which generates a control signal on the basis of the instruction, wherein the controller controls the display apparatus in such a manner that a selection display comprising a plurality of selection items is displayed along the side of the display screen when the finger or the touch pen is touched to the sensor unit and one of the selection items is instructed when the finger or the touch pen is moved along the side on the sensor unit, and the controller generates the control signal to instruct selection of the instructed selection item when the finger or the touch pen is released from the sensor unit.

According to the invention, by displaying the selection display, for example, a menu by the touch and releasing the finger or the touch pen from the sensor unit one selection item for example, a source can be selected. The display of the menu and the selection can be executed by one touching and releasing operation and the operability can be improved. Since the selection display is displayed along the side near the sensor unit, the items which are instructed can be easily seen and a situation that the display screen cannot be easily seen because of the selection display can be avoided.

BEST MODE FOR CARRYING OUT THE INVENTION

An embodiment of the invention will be described hereinbelow with reference to the drawings.

Figure 1:
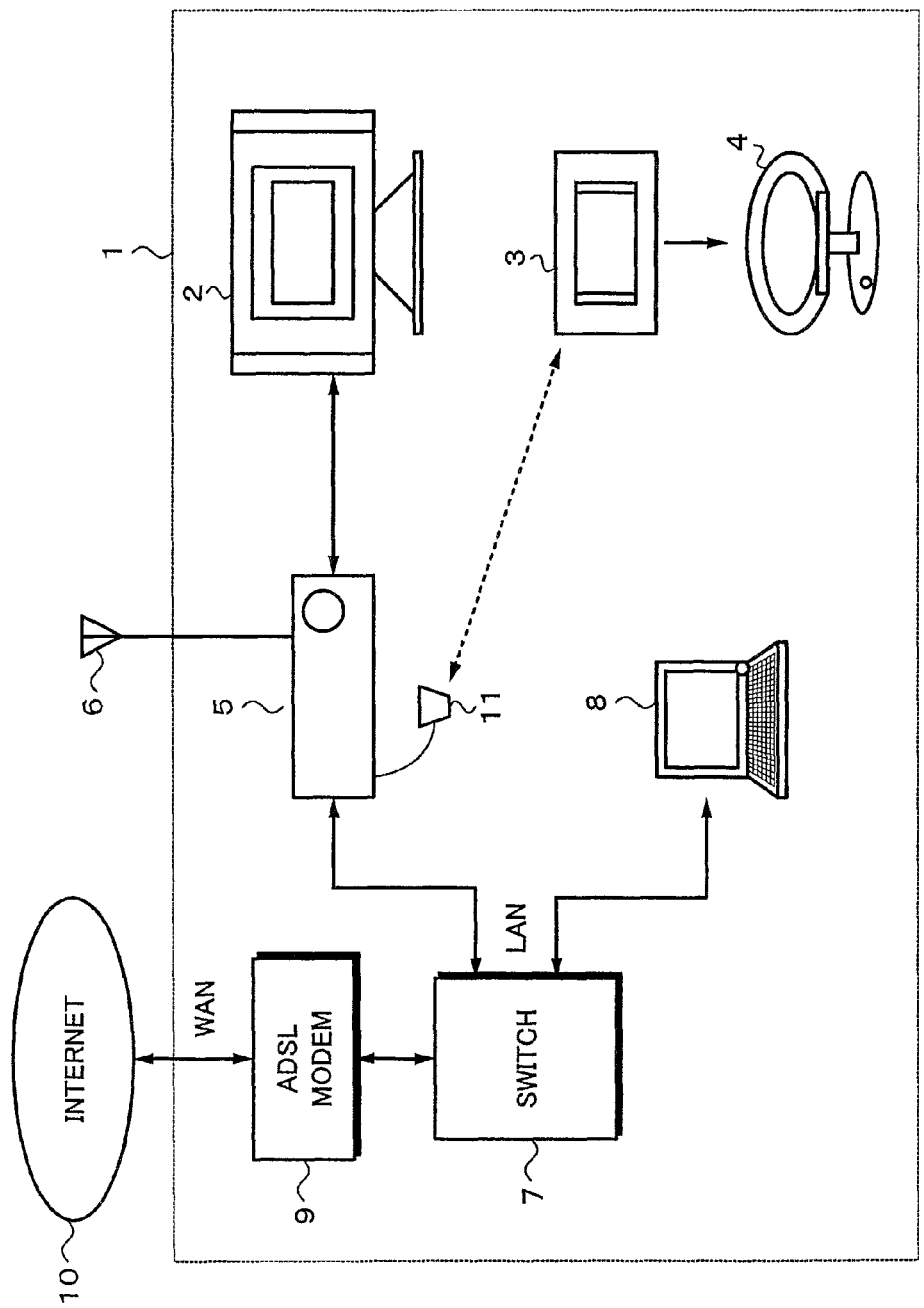
FIG. 1 is a block diagram showing a system construction of an embodiment of the invention.

In FIG. 1, reference numeral 1 denotes a whole display system to which the invention is applied; 2 indicates a first display unit (hereinafter, properly referred to as a primary display) having a large display panel such as PDP (Plasma Display Panel), LCD (Liquid Crystal Display), or the like; and 3 a small secondary display (hereinafter, properly referred to as a secondary display). The secondary display 3 has a construction in which a touch panel is laminated onto a small LCD of, for example, 7 inches, is put on a pedestal 4, and can be carried by the user as necessary.

A video signal to be displayed is supplied to the primary display 2 through a media receiver 5. The video signal is a broadcast signal or streaming date which is distributed through the Internet. The broadcast signal is received by an antenna 6, the streaming data is branched by a switch 7, and they are supplied to the media receiver 5 through a LAN (Local Area Network). A personal computer 8 is connected to another branch of the switch 7.

The streaming data distributed through Internet 10 is inputted to a WAN (Wide Area Network) side of a MODEM (modulator-demodulator) of an ADSL (Asymmetric Digital Subscriber Line). The switch 7 is connected to the LAN side of a MODEM 9. The ADSL is an example of broadband connection. As another method, video contents can be received through broadband connection using a CATV (cable television), an FTTH (Fiber To The Home), or the like. Ordinarily, the video contents is associated with audio data.

The media receiver 5 has two tuners to supply the reception signal to each of the primary display 2 and the secondary display 3. The media receiver 5 can transmit the video signal to the secondary display 3 through an access point 11 of a wireless LAN. Control data such as a remocon (remote control) signal or the like can be transmitted to the access point 11 from the secondary display 3 and bidirectional communication can be made. For example, a wireless system of IEEE (Institute of Electrical and Electronics Engineers) 802.11 can be used and the standard of, for example, 802.11a in such a wireless system can be used. This standard uses a frequency of 5.2 GHz and can realize a transmission speed of maximum 54 Mbps.

Figure 2:
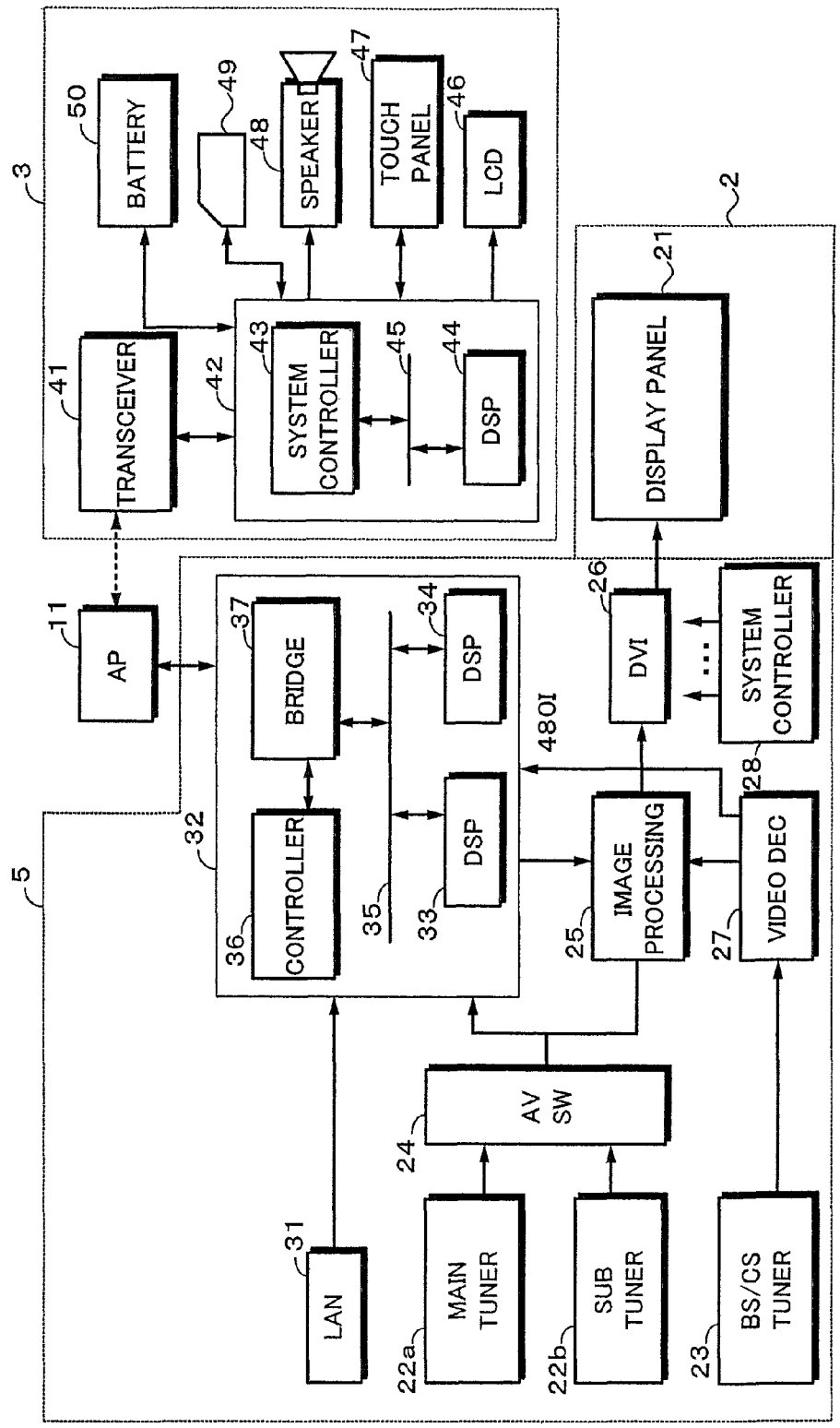
FIG. 2 is a block diagram showing a more detailed construction of the embodiment of the invention.

FIG. 2 shows in more detail, a construction of an example of the display system comprising the primary display 2 and the secondary display 3. The primary display 2 has a relatively large display panel 21 of, for example, 30 inches or more and its driving unit (act shown).

A main tuner 22a and a subtuner 22b each for receiving a terrestrial wave are included in the media receiver 5. Reference numeral 23 denotes a digital tuner for receiving BS (Broadcasting Satellite) and 110° CS (Communication Satellite). Although not shown, outputs of UHF/VHF antennas are supplied to the tuners 22a and 22b and an output of a parabolic antenna for receiving BS/110° CS is supplied to the digital tuner 23. In the embodiment, the main tuner 22a is used for the primary display 2 and the subtuner 22b is used for the secondary display 3.

The video signals of the main tuner 22a and the subtuner 22b are supplied to an AV switch 24. An output video signal of the AV switch 24 is inputted to an image processing unit 25 and a signal processing unit 32. The image processing unit 25 executes image processes for improving picture quality such as a process to further raise resolution and the like.

An output signal of the image processing unit 25 is inputted to the display panel 21 of the primary display 2 through a DVI (Digital Visual Interface) 26 as a display interface. Although not shown, a picture quality adjusting circuit of the display panel 21 is provided at the front stage of the DVI 26. Further, in the case of supplying the digital video signal to the display panel 21, a copy prevention signal to prevent illegal copy of the broadcast contents is also outputted. For example, HDCP (High bandwith Digital Content Protection) can be used.

An output signal of the digital tuner 23 is inputted to a video decoder 27. For example, decoding by MPEG2 (Moving Picture Experts Group Phase 2) is executed by the video decoder 27. An HD (High Definition) videos signal from the video decoder 27 is supplied to the image processing unit 25 and inputted to the display panel 21 through the DVI 26.

The video decoder 27 has a function for outputting an SD (Standard Definition) video signal, for example, 480I (interlace signal in which the number of lines is equal to 480) to the signal processing unit 32. Reference numeral 28 denotes a system controller for controlling the operations of the primary display 2 and the media receiver 5 and the controller 28 is constructed by a CPU (Central Processing Unit). For example, the system controller 28 controls station selecting states of the main tuner 22a and the subtuner 22b.

The streaming data and the data of Homepage which were received through the Internet are supplied to the signal processing unit 32 through a LAN 31. In the signal processing unit 32, two DSPs (Digital Signal Processors) 33 and 34 are connected to a bus such as PCI (Peripheral Component Interconnect) 35 and a controller 36 comprising a CPU is connected to the PCI 35 through a bridge 37.

The signal processing unit 32 decodes the inputted streaming data. The decoded video signal is supplied to the image processing unit 25 and displayed by the primary display 2. Therefore, the broadcast signal from each of the main tuner 22a and the digital tuner 23 can be displayed on the primary display 2 and the contents received through the Internet can also be displayed.

The signal processing unit 32 encrypts the video signals from the subtuner 22b and the digital tuner further, converts the encrypted video signals into a format in which they can be transmitted in a wireless manner, and sends the converted signals to the secondary display 3 through the access point 11. The contents such as streaming data received through the Internet and the like are sent to the secondary display 3 through the access point 11 without being decoded. On the other hand, the signal processing unit 32 processes the control signal such as a remocon signal or the like from the secondary display 3 which was received by the access point 11 and sends it to the system controller 28.

The secondary display 3 has a transceiver 41 for making wireless communication with the access point 11. A signal processing unit 42 is connected to the transceiver 41. In the signal processing unit 42, a system controller 43 to control the operation of the secondary display 3 and a DSP 44 are connected through PCI 45.

A display panel, for example, an LCD 46, a transparent touch panel 47 laminated on the display screen of the LCD 46; a speaker 48, and a memory card 49 are connected to the signal processing unit 42. Further, a battery 50 as a power source is provided. The battery 50 is enclosed in, for example, the pedestal (refer to FIG. 1). The signal processing unit 42 decodes the encrypted video signal received from the access point 11, decodes the data received through the Internet, and displays the decoded signal onto the LCD 46. Further, the signal processing unit 42 transmits a remocon signal, a command, or the like generated by the operation of the touch panel 47 to the primary display 2 side. Moreover, the signal processing unit 42 has a function for decoding still image data stored in the memory card 49 and displaying it onto the LCD 46.

The operation of the foregoing display system according to the embodiment of the invention will be described hereinbelow. The analog video signal of a base band demodulated by the main tuner 22a is converted into a digital signal, subjected to the picture quality improving process by the image processing unit 25, subjected to an interlace/progressive converting process, and thereafter, outputted to the display panel 21 through the DVI 26.

A base band analog signal, demodulated by the subtuner 22b is supplied to the signal processing unit 32, converted into a digital signal, and thereafter, compressed in a digital compression format such as MPEG2, MPEG4, or the like. The compressed video signal is subjected to an encrypting process and, thereafter, transmitted to the secondary display 3 through the access point 11 by the wireless LAN. The signal is subjected to a process for decrypting the encryption and a decompressing process by the signal processing unit 42 of the secondary display 3 and displayed by the LCD 46.

In the case where the input source is a digital broadcast signal, the digital broadcast signal is inputted to the digital tuner 23 and demodulated by a digital front-end block of the digital tuner 23. After that, the digital video signal is decoded by the video decoder 27. The digital video signal is displayed onto the display panel 21 through the image processing unit 25 and the DVI 26.

The SD signal, for example, the video signal of 480I which is outputted from the video decoder 27 is sent to the signal processing unit 32, compressed in a digital compression format and encrypted by the signal processing unit 32. The resultant signal is transmitted to the secondary display 3 from the access point 11 of the wireless LAN. In the case where the input source is the HD signal, it is down-converted into the SD signal, for example, the video signal of 480I and, thereafter, sent to the signal processing unit 32. The down-conversion is a process for protection of a copyright of the digital broadcast contents.

In the case where the input source is the streaming contents from the Internet, the signal inputted from the LAN 31 is subjected to a streaming decoding process in the signal processing unit 32 in accordance with the streaming compression format and seat to the display panel 21 through the image processing unit 25 and the DVI 26.

In the case of displaying the streaming contents onto the secondary display 3, it is not subjected to the decoding process in the signal processing unit 32 but is transmitted to the secondary display 3 by the wireless LAN while keeping the state where it has been compressed by the streaming compression format. The decoding process of the streaming compression is executed by the signal processing unit 42 of the secondary display 3, the decoded video image is displayed by the LCD 46, and the decoded audio sound is reproduced by the speaker 48.

In the foregoing display system, the invention intends to improve the station selecting operation of the broadcasting and a GUI (Graphical User Interface) at the time of selecting the contents of the Internet. That is, hitherto, in the case of operating the touch panel, when the user selects the desired contents, first, he enters the menu display mode or executes the operation corresponding to such an operation and, thereafter, he further selects the source to be monitored from the menu. In this manner, the operations of two stages are certainly necessary until the target reaches the desired contents. By improving such a drawback, those operations can be realized by the touching and releasing operation, that is, one operation.

Figure 3A:
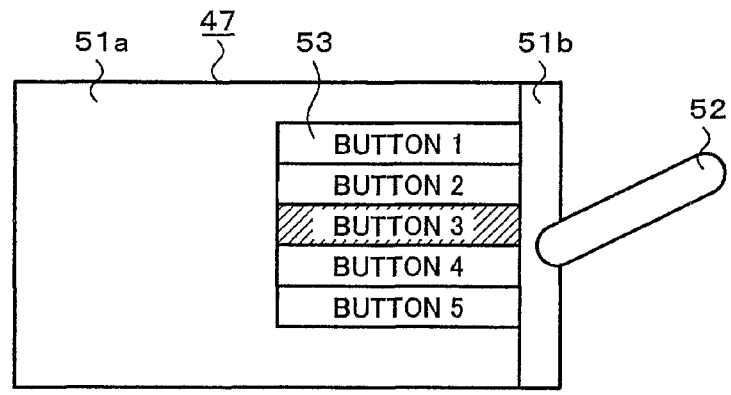
FIGS. 3A to 3C are schematic diagrams for use in explanation of the embodiment of the invention.

An outline of the embodiment of the invention will now be described with reference to FIGS. 3A to 3C and 4. FIG. 3A shows the touch panel 47 laminated on the LCD 46 of the secondary display 3. Since the touch panel 47 is transparent, the display image on the LCD 46 can be seen through the touch panel 47. As a specific structure of the touch panel 47, either a pressure sensitive type in which the position where a contact pressure has been applied is detected or an electrostatic type in which the contact is detected as a change in electrostatic capacitance can be used. Further, a touch panel of an infrared detection system in which a number of sensors comprising infrared light emitting diodes and phototransistors are provided can be also used.

Figure 3B:
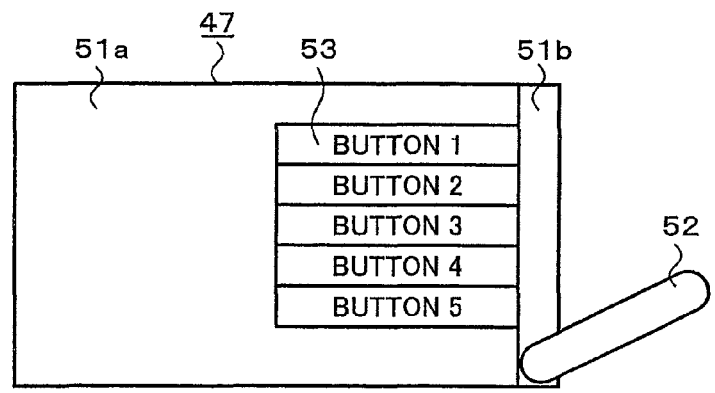
Figure 3C:
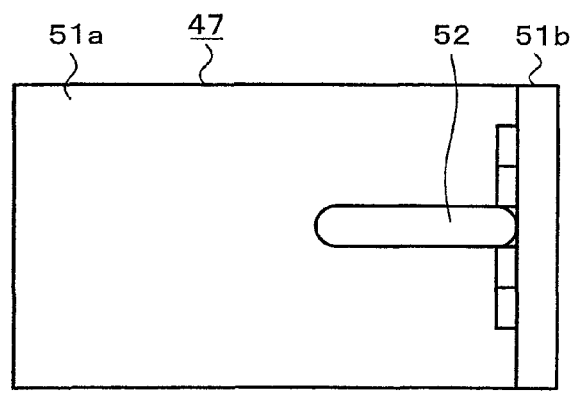

Ordinarily, a size of touch panel 47 is almost equal to that of the display screen of the LCD 46. In the embodiment, the size of touch panel 47 is larger than that of the display screen of the LCD 46. In the examples of FIGS. 3A to 3C, the touch panel 47 comprises: a display/sensor unit 51a which is slightly larger than the display screen of the LCD 46; and a sensor unit 51b which is projected to the outside from one side, for example, from one side on the right. A finger 52 of the user (a rod-shaped touch pen can be also used in place of the finger) is touched to a selection item (item to be selected) such as desired button, icon, or the like on the display/sensor unit 51a and vertically moved on the sensor unit 51b.

A selection display 53 comprising a plurality of selection items, for example, first to fifth buttons is displayed along the side of the right side of the display screen by the LCD 46 in accordance with the operation of the touch panel 47. In the embodiment, a plurality of selection displays 53 are displayed in the vertical direction in parallel with the sensor device portion 51b.

As a construction of the touch panel 47, a construction other than that mentioned above can be used. For example, it is also possible to construct in such a manner that the sensor unit is provided on the outside of another side (left side, upper side, or lower side) of the display screen of the LCD 46 and a selection display in which a plurality of selection items are arranged is displayed along such another side by the LCD 46. A belt-shaped touch panel can be also partially provided along one side of the display screen.

Since the sensor unit 51b is provided on the outside of the display screen, a situation that the display screen cannot be easily seen due to the dirt by repetitively operating the sensor unit 51b can be avoided. Since the selection display 53 is displayed at the end of the display screen along the side where the sensor unit 51b is provided, a degree at which the display image on the LCD 46 cannot be easily seen because of the selection display 53 can be reduced.

Figure 4:
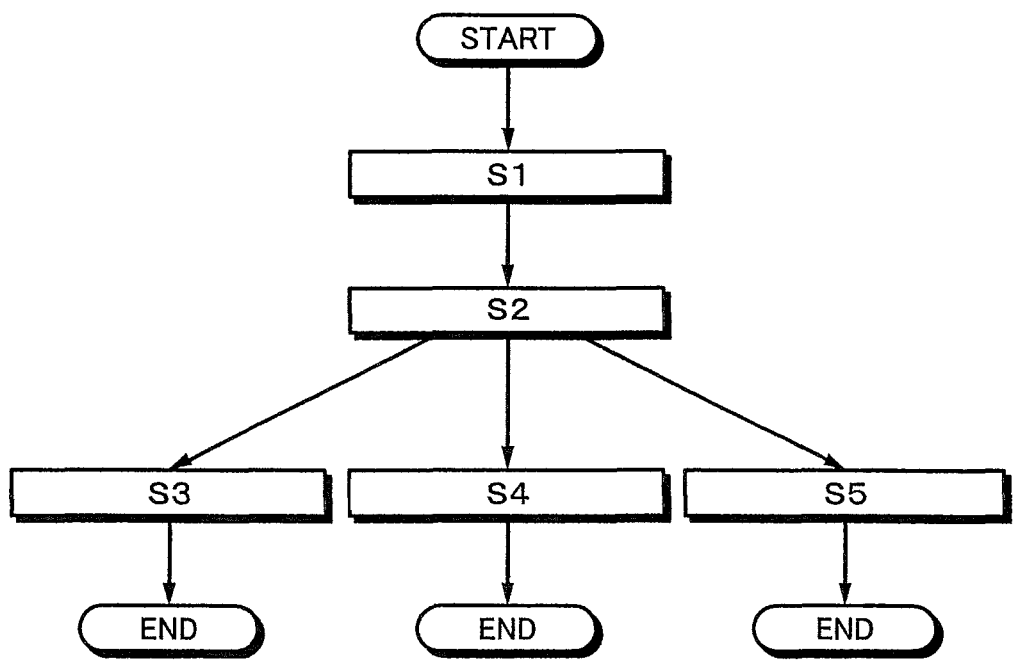
FIG. 4 is a flowchart for use in explanation of the embodiment of the invention.

In a flowchart shown in FIG. 4, the sensor unit 51b is touched with the finger 52 in step S1. Thus, the selection display 53 is displayed on the display screen as shown in FIG. 3A.

In step S2, when the finger 52 is vertically moved while keeping the state where the finger is touched onto the sensor unit 51b, the button in the position of the same height as that of the finger is instructed and highlighted. The "highlight" denotes a display in which the instructed button can be visually identified, that is, the luminance, color, reversal indication, flickering, or the like is made different. FIG. 3A, the third button is highlighted.

In step S3, when the finger 52 is released from the sensor unit 51b in the state where the third button is highlighted, the third button is selected. That is, the operation to display the selection display 53 and the operation to select a desired selection item in the selection display 53 can be executed by one touching and releasing operation. Since the third button is selected, a display screen of a lower layer corresponding to the third button is displayed by the LCD 46.

In the case where although the position of the finger 52 is on the sensor unit 51b, there is no button beside the finger as shown in FIG. 3B, the button is not highlighted. That is, when the finger is touched to the upper or lower area out of the range where the five buttons are arranged, since there are no neighboring buttons, every button is not highlighted. Step S4 shows the case where the finger is released from the sensor unit 51b in this state. In this case, it is judged that the selecting operation has been cancelled, the processing routine is finished, and therefore, the state does not change and the display of the selection display 53 is continued.

Further, when the finger 52 is moved to the display/sensor unit 51a as shown in FIG. 3C, it is judged that the selecting operation has been cancelled, the processing routine is finished, and the display of the selection display 53 disappears. In this case, even if the finger 52 is released, the state is not changed.

Figure 5:
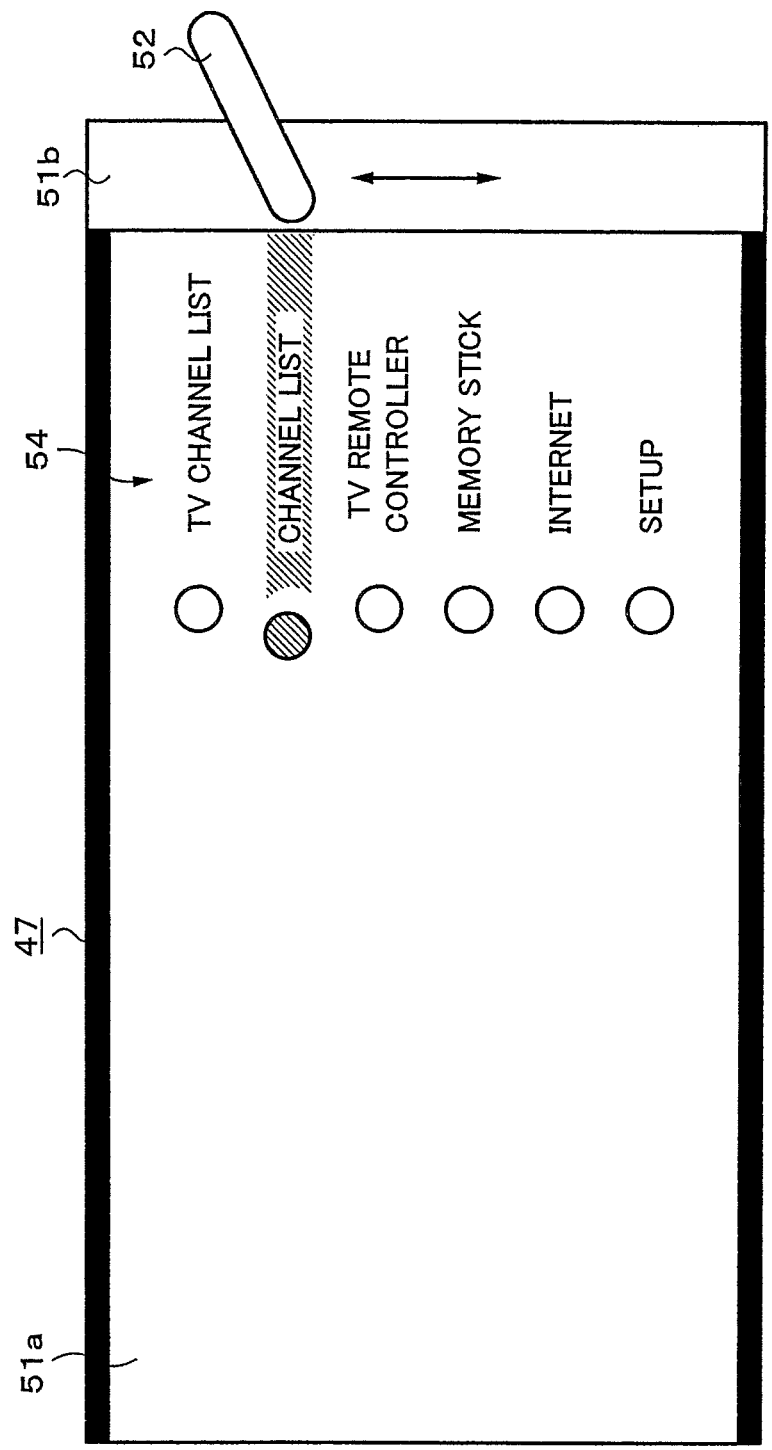
FIG. 5 is a schematic diagram showing a more specific display example of the embodiment of the invention.

A more specific example of the foregoing embodiment will now be described. FIG. 5 shows a selection display, for example, a menu display 54 which is displayed when the finger 52 is touched to the sensor unit 51b of the right side of the touch panel 47. When the finger 52 is vertically moved while keeping the state where it is touched to the sensor unit 51b, only the menu item of almost the same height as that of the finger 52 is highlighted. FIG. 5 shows the state where a channel list of the menu item is highlighted.

When the finger 52 is released at the position of the highlighted menu item, this menu item is selected. A display screen of a lower layer corresponding to the selected menu item is displayed. Although not shown in FIG. 5, when the menu display 54 is displayed, the image of the LCD 46 of the secondary display 3 is displayed on the display/sensor unit 51a of the touch panel 47.

Figure 6:
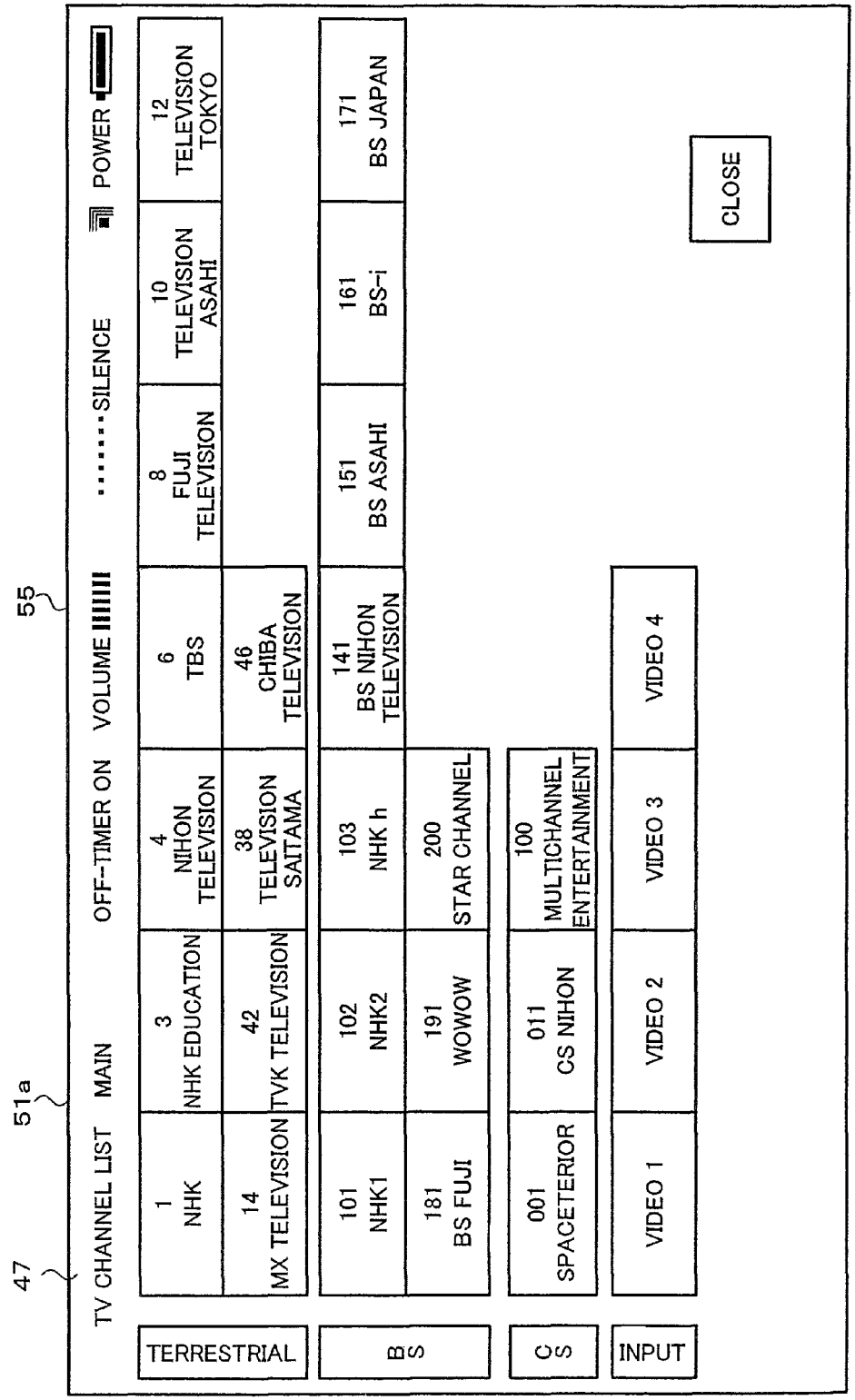
FIG. 6 is a schematic diagram showing a display example corresponding to a menu selected by a menu display.

FIG. 6 shows an example of a display 55 in the case where a menu item of "television channel list" is selected. Channels of the terrestrial wave, BS, CS, and inputs (Video 1 to Video 4) are displayed on the LCD 46. A desired channel can be selected by the display/sensor unit 51a of the touch panel 47. The channel list of FIG. 6 is a display of the list showing, for example, the items which are displayed on the primary display 2.

Figure 7:
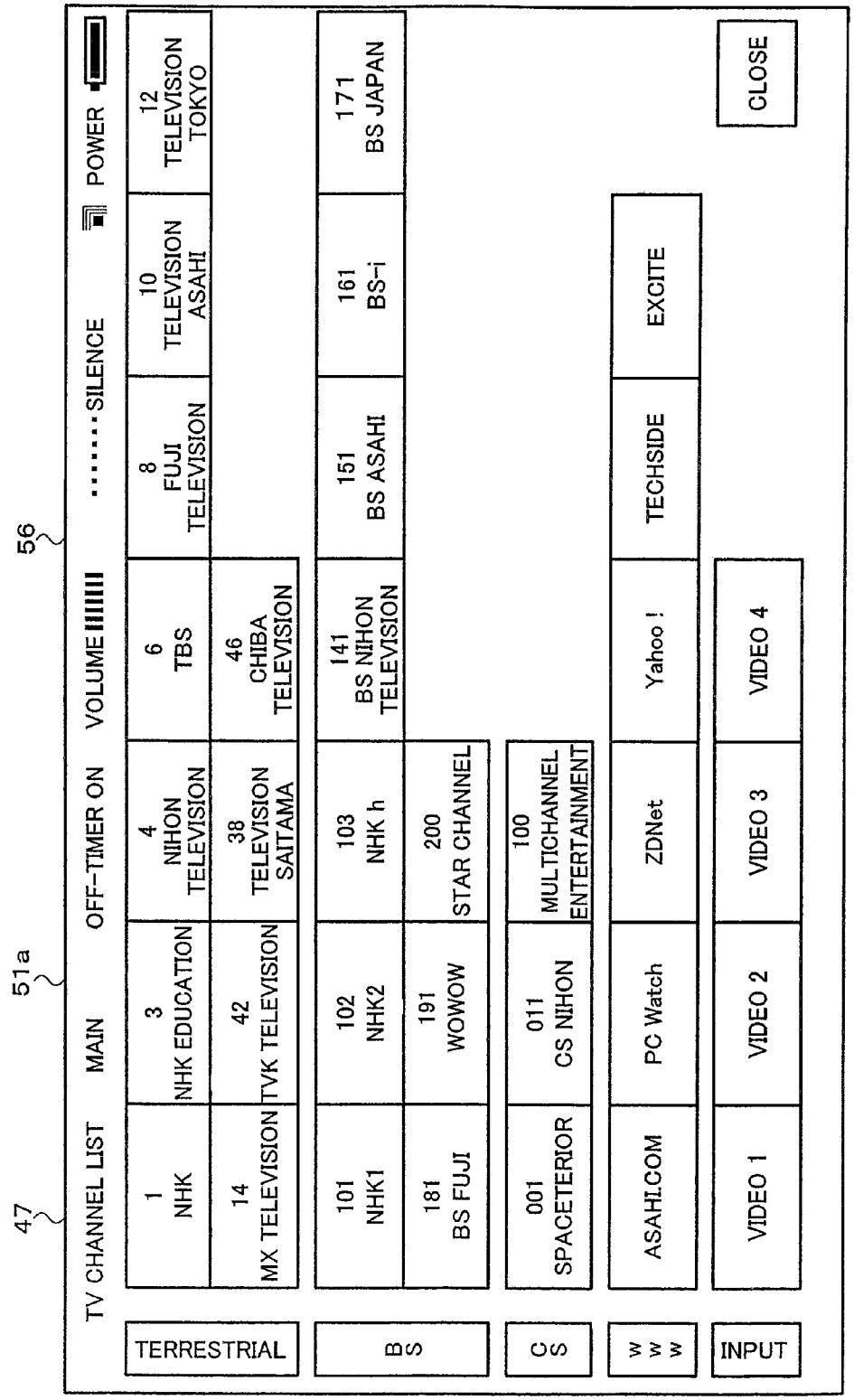
FIG. 7 is a schematic diagram showing a display example corresponding to a menu selected by the menu display.

FIG. 7 shows an example of a display 56 in the case where a menu item of "channel list" is selected. It shows a list of the contents which can be received by the secondary display 3. In addition to the channels of the television and the video inputs shown in FIG. 6, channels of news and the like which are received through the Internet are displayed on the LCD 46. A desired channel can be selected by the display/sensor unit 51a of the touch panel 47.

Figure 8:
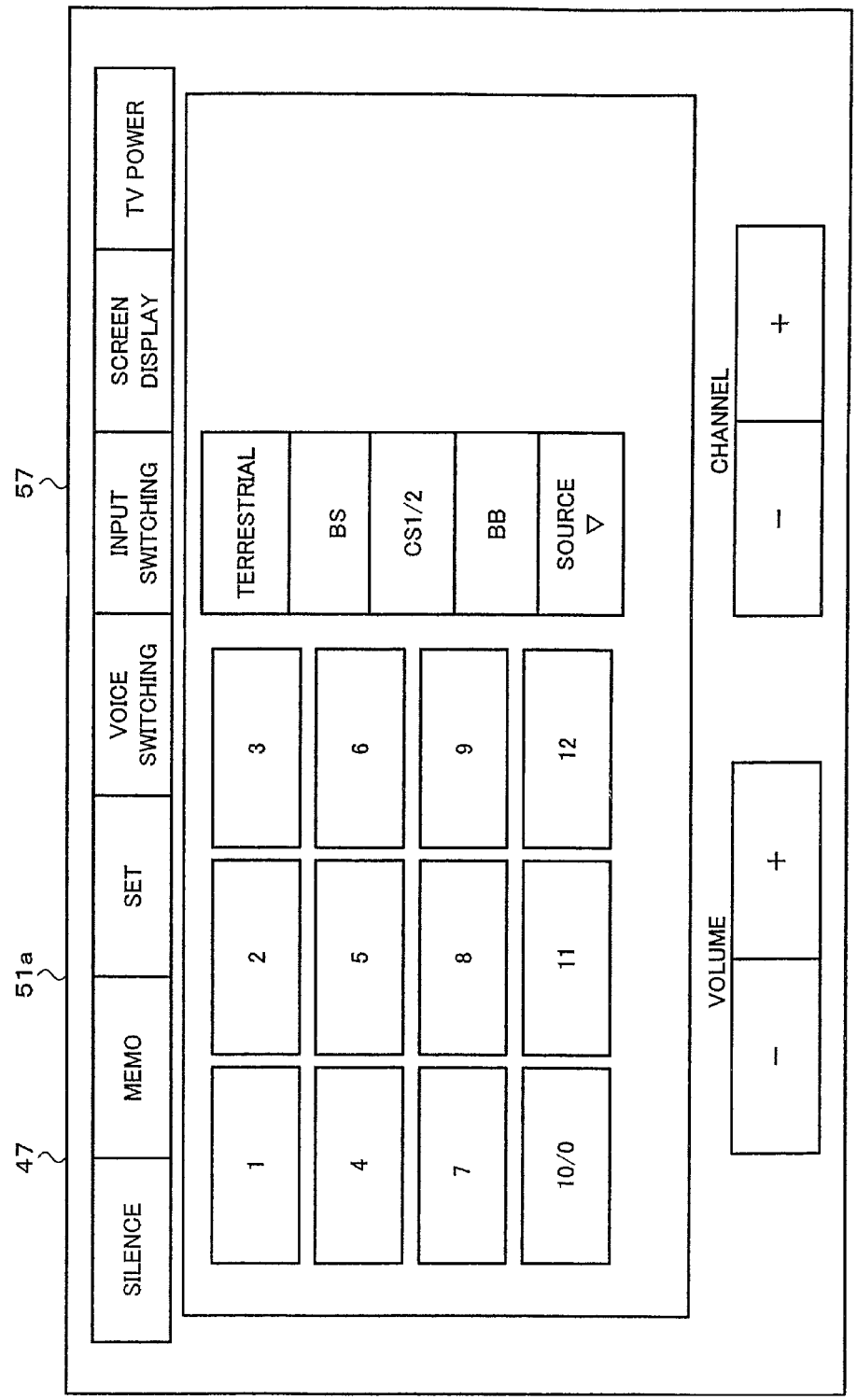
FIG. 8 is a schematic diagram showing a display example corresponding to a menu selected by the menu display.

FIG. 8 shows an example of a display 57 in the case where a menu item of "TV remocon" is selected. Buttons for remocon (remote control) are displayed on the display screen of the LCD 46. By pressing a desired button in the display/sensor unit 51a of the touch panel 47, the primary display 2 and the media receiver 5 can be controlled. The buttons for raccoon are buttons for ten-key, increase/decrease in sound volume, channel switching, and the like.

Figure 9:
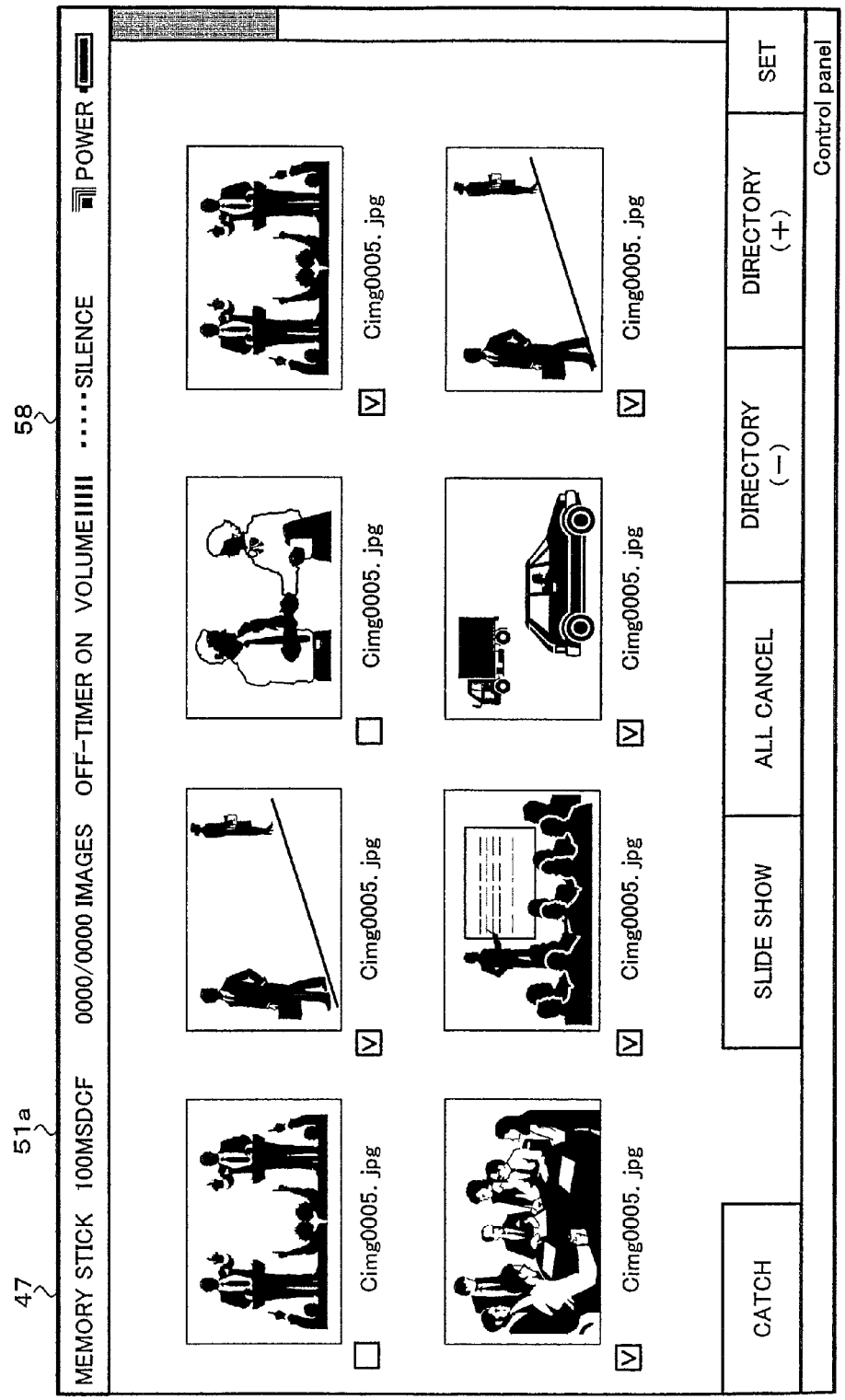
FIG. 9 is a schematic diagram showing a display example corresponding to a menu selected by the menu display.

FIG. 9 shows an example of a display 58 in the case where a menu item of "memory stick (registered trade name)" is selected. Thumbnails of still images recorded in the memory card 49 are displayed on the display screen of the LCD 46.

Nine thumbnails can be displayed at once. The thumbnails which are displayed can be switched by vertically scrolling.

Figure 10:
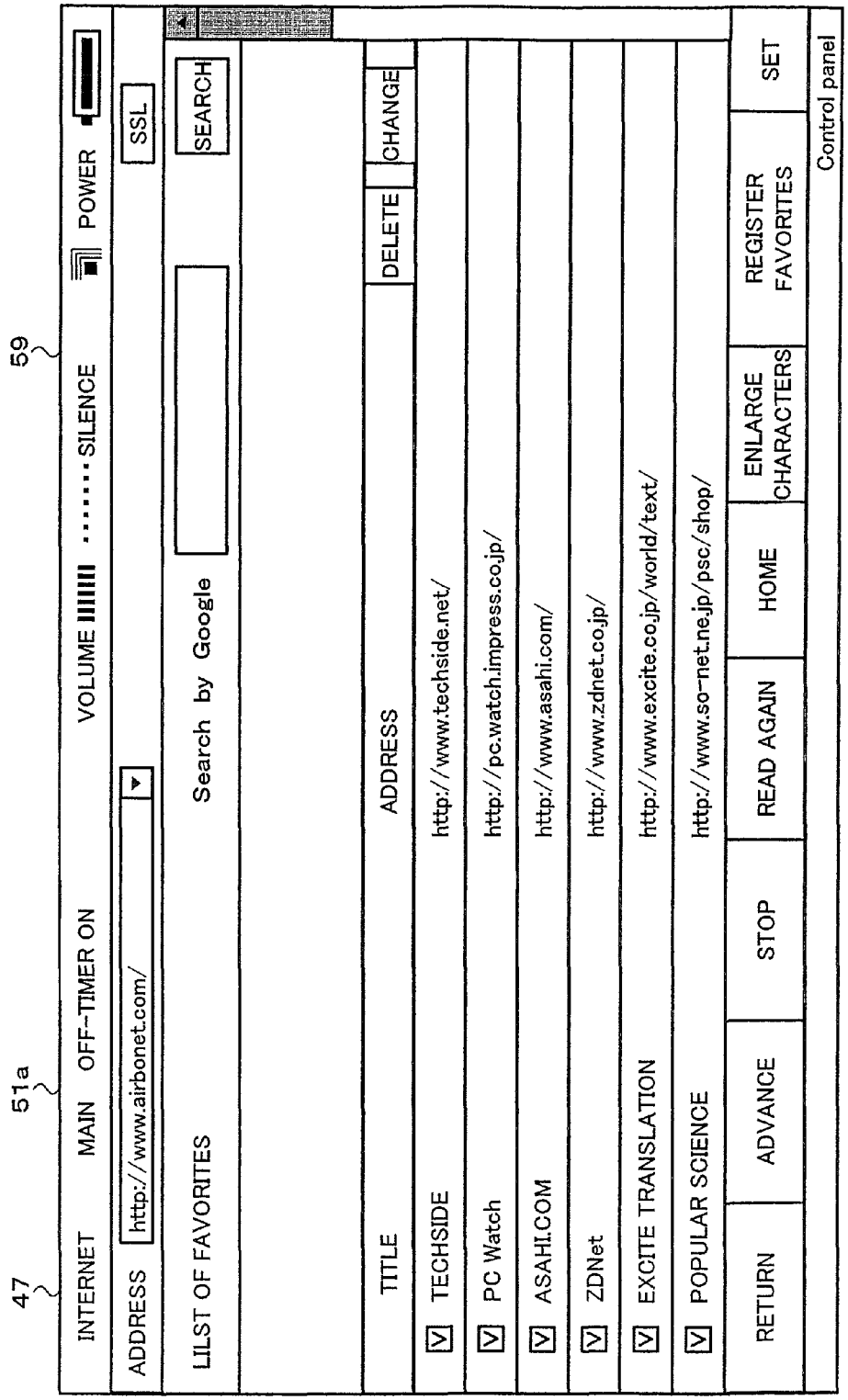
FIG. 10 is a schematic diagram showing a display example corresponding to a menu selected by the menu display.

FIG. 10 shows an example of a display 59 in the case where a menu item of "Internet" is selected. A list of titles and addresses of Homepages registered as "favorites" is displayed on the display screen of the LCD 46. A column to input words or phrases for searching is displayed. Further, other buttons necessary to access a site through the Internet are displayed. Browsing of Homepage is ordinarily performed on the secondary display 3.

Figure 11:
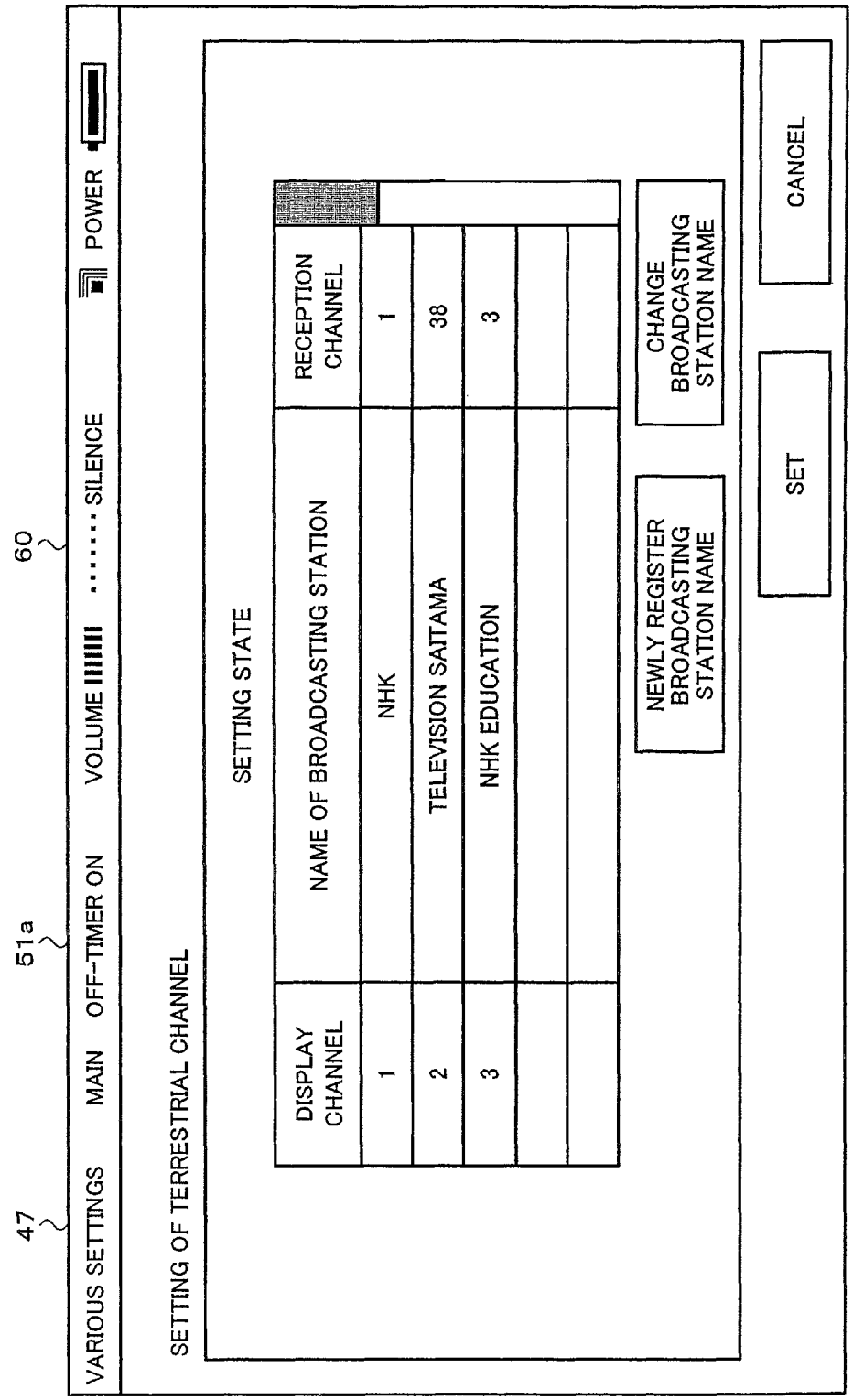
FIG. 11 is a schematic diagram showing a display example corresponding to a menu selected by the menu display.
Figure 12:
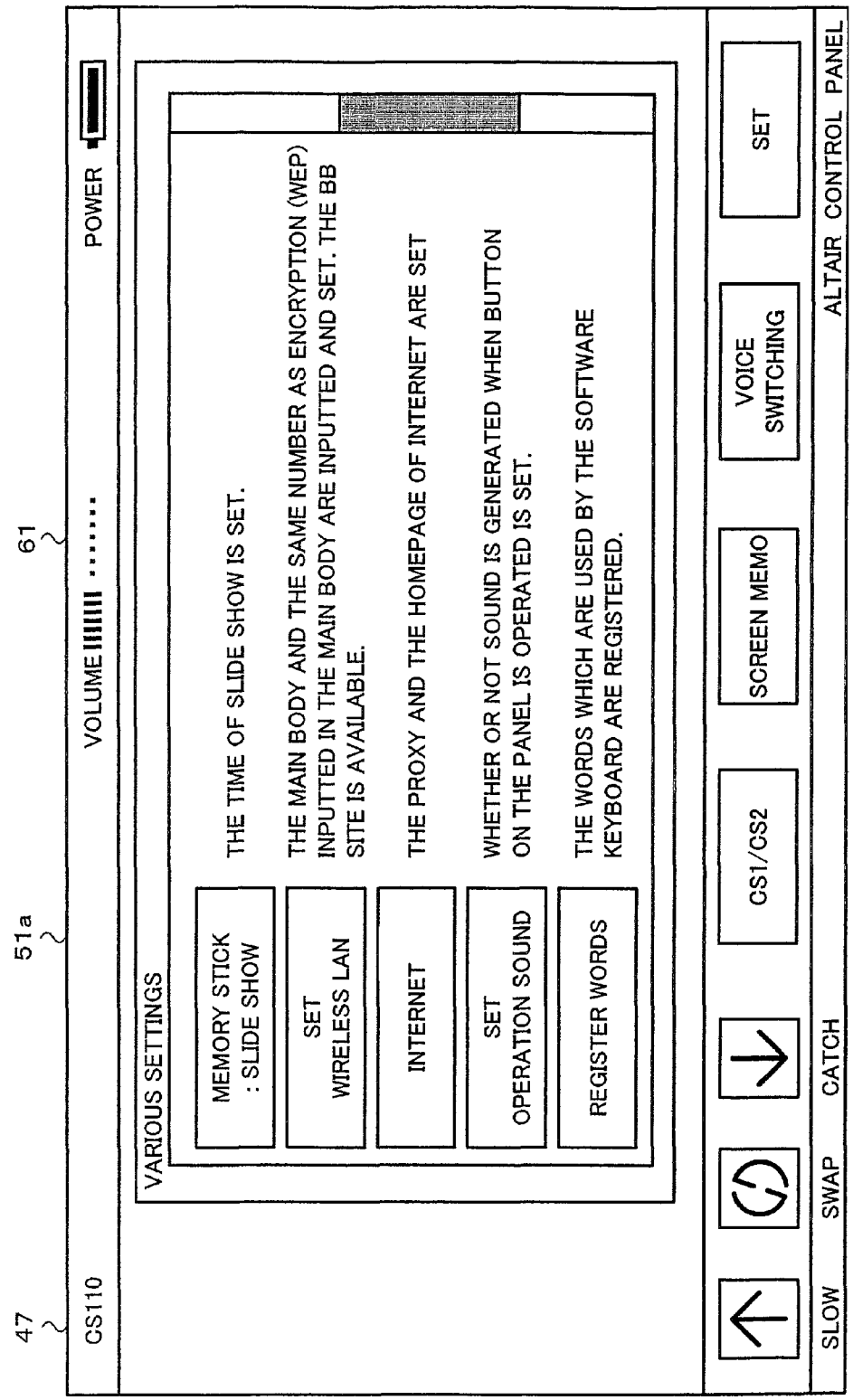
FIG. 12 is a schematic diagram showing a display example corresponding to a menu selected by the menu display.

FIG. 11 shows an example of a display 60 in the case where a menu item of "setup" is selected. This display 60 is displayed to set the terrestrial channel. FIG. 12 shows an example of a display 61 in the case where a menu of "setup" is selected. When the menu of the setup is selected, the displays 60 and 61 are used and the states of the primary display 2 and the media receiver 5 are set.

In FIG. 12, buttons of the operations of throw, "swap", and "catch" are displayed on the lower side of the display 61. Throw is a process for displaying the same image as that displayed on the secondary display 3 onto the primary display 2. "Swap" is a process for exchanging the display of the primary display 2 for the display of the secondary display 3. "Catch" is a process for displaying the same image as that displayed on the primary display 2 onto the secondary display 3.

Commands for executing such processes can be generated by the operation to move the finger 52 from the bottom to the top on the touch panel 47 (in the case of throw) or the operation to more the finger 52 from the top to the bottom (in the case of "catch") besides the operation to touch onto the buttons mentioned above. Such a changing process of the display image can be realized by transmitting the commands from the secondary display 3 to the primary display 2 side and controlling the main tuner 22a and the subtuner 22b by the system controller 25. By the control of the tuners, it is possible to execute the operation which gives an impression as if the image were bidirectionally transmitted and received between the display panel 21 of the primary display 2 and the LCD 46 of the secondary display 3.

The invention is not limited to the embodiment or the like of the invention as mentioned above but various modifications and applications are possible within the scope without departing from the essence of the invention. For example, the invention can be applied to a television apparatus having one display or the like besides the system having the primary display 2 and the secondary display 3.

What is claimed is:

1. An input method using a sensor unit, in which the sensor unit is located to an outside of one side of a display screen, an instruction according to a touching position of a finger or a touch pen onto said sensor unit is given, and a controller generates a control signal on the basis of said instruction, comprising the steps of:

displaying a selection display, comprising a plurality of selection menu items, on said display screen;

highlighting one of said selection menu items in a position of a same height as that of the finger or the touch pen when the finger or the touch pen is vertically moved while keeping a state where the finger or the touch pen is touched onto the sensor unit; and automatically selecting said highlighted selection menu item upon lifting the finger or the touch pen, from constant contact with said sensor unit, in the position of the same height as that of the position of the highlighted selection item, wherein a single press and release contact operation of the finger or the touch pen with the sensor unit executes a combined operation (a) to highlight the selection, menu item and (b) to select the selection menu item on the selection display.

2. The input method according to claim 1, wherein by operating a predetermined button on the display screen, an instruction corresponding to said button is generated.

3. The input method according to claim 1, wherein said selection display is finished when the linger or the touch pen is moved from said sensor unit to said display screen.

4. The input method according to claim 1, wherein said selection display is a menu display.

5. The input method according to claim 1, further comprising the step of cancelling display of the selection display when the finger or the touch pen is slid along said sensor unit and moves off said sensor unit onto said display screen.

6. An input method using a sensor unit, in which the sensor unit is located to an outside of one side of a display screen, an instruction according to a touching position of a finger or a touch pen onto said sensor unit is given, and a controller generates a control signal on the basis of said instruction, comprising the steps of:
highlighting one of plural selection menu items on a selection display in a position of a same height as that of the finger or the touch pen when the finger or the touch pen is vertically moved white keeping a state where the finger or the touch pen is touched onto the sensor unit; and
automatically selecting said highlighted selection menu item upon lifting the finger or the touch pen, from constant contact with said sensor unit, in the position of the same height as that of the position of the highlighted selection menu item,
wherein a single press and slide operation of the finger or the touch pen with the sensor unit executes a combined operation (a) to highlight the selection menu item and (b) to cancel display of the selection display.

7. The input method according to claim 6, wherein by operating a predetermined button on the display screen, an instruction corresponding to said button is generated.

8. The input method according to claim 6, wherein said selection display is finished when the finger or the touch pen is moved from said sensor unit to said display screen.

9. The input method according to claim 6, wherein said selection display is a menu display.

10. The input method according to claim 6, further comprising the step of cancelling display of the selection display when the finger or the touch pen is slid along said sensor unit and moves off said sensor unit onto said display screen.

11. An input method using a sensor unit, in which the sensor unit is located to an outside of one side of a display screen, an instruction according to a touching position of a finger or a touch pen onto said sensor unit is given, and a controller generates a control signal on the basis of said instruction, comprising the steps of:
displaying a selection display, comprising a plurality of selection menu items on said display screen after the finger or the touch pen initially touches said sensor unit;
highlighting said selection menu items in a position of a same height as that of the finger or the touch pen when the finger or the touch pen is vertically moved while keeping a state where the finger or the touch pen is touched onto the sensor unit; and
automatically selecting said highlighted selection menu item upon lifting the finger or the touch pen, from constant contact with said sensor unit after being vertically slid along said sensor unit, in the position of the same height as that of the position of the highlighted selection menu item,
wherein a single press, slide and release contact operation of the finger or the touch pen with the sensor unit executes a combined operation (a) to highlight a selection menu item and (b) to select a desired selection menu item on the selection display.

12. The input method according to claim 11, wherein by operating a predetermined button on the display screen, an instruction corresponding to said button is generated.

13. The input method according to claim 11, wherein said selection display is finished when the finger or the touch pen is moved from said sensor unit to said display screen.

14. The input method according to claim 11, wherein Said selection display is a menu display.

15. The input method according to claim 11, further comprising the step of cancelling display of the selection display when the finger or the touch pen is slid along said sensor unit and moves off said sensor unit onto said display screen.

16. An input method using a sensor unit, in which the sensor unit is located to an outside of one side of a display screen, an instruction according to a touching position of a finger or a touch pen into said sensor unit is given, and a controller generates a control signal on the basis of said instruction, comprising the steps of:
highlighting selection menu items on a selection display in a position of a same height as that of the finger or the touch pen when the finger or the touch pen is vertically moved while keeping a state where the finger or the touch pen is touched onto the sensor unit; and
automatically selecting said highlighted selection menu item upon lifting the finger or the touch pen, from constant contact with said sensor unit after being vertically slid along said sensor unit, in the position of the same height as that of the position of the highlighted selection menu item,
wherein a single press, slide and release contact operation of the finger or the touch pen with the sensor unit executes a combined operation (a) to highlight a selection menu item and (b) to select a desired selection menu item on the selection display or to cancel display of the selection display.

17. The input method according to claim 16, wherein by operating a predetermined button on the display screen, an instruction corresponding to said button is generated.

18. The input method according to claim 16, wherein said selection display is finished when the finger or the touch pen is moved from said sensor unit to said display screen.

19. The input method according to claim 16, wherein said selection display is a menu display.

20. The input method according to claim 16, further comprising the step of cancelling display of the selection display when the finger or the touch pen is slid, along said sensor unit and moves off said sensor unit onto said display screen.

\* \* \* \* \*